(12) United States Patent
Takemura

(10) Patent No.: US 9,218,214 B2
(45) Date of Patent: Dec. 22, 2015

(54) INFORMATION PROCESSING APPARATUS AND INFORMATION PROCESSING METHOD

(75) Inventor: Toshinori Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 513 days.

(21) Appl. No.: 13/575,890

(22) PCT Filed: Jan. 12, 2011

(86) PCT No.: PCT/JP2011/000097
§ 371 (c)(1),
(2), (4) Date: Jul. 27, 2012

(87) PCT Pub. No.: WO2011/093011
PCT Pub. Date: Aug. 4, 2011

(65) Prior Publication Data
US 2012/0311600 A1     Dec. 6, 2012

(30) Foreign Application Priority Data
Jan. 29, 2010   (JP) ................... 2010-018990

(51) Int. Cl.
G06F 15/173      (2006.01)
G06F 9/50        (2006.01)

(52) U.S. Cl.
CPC ........ G06F 9/505 (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 6,802,062 B1 | 10/2004 | Oyamada et al. | |
| 7,171,668 B2 * | 1/2007 | Molloy et al. | ................. 718/105 |
| 8,024,736 B1 * | 9/2011 | Graupner et al. | ............. 718/104 |
| 8,365,182 B2 * | 1/2013 | Groetzner et al. | ............ 718/104 |
| 8,370,472 B2 * | 2/2013 | Diwakar et al. | ............... 709/223 |
| 2007/0283009 A1 * | 12/2007 | Takemura | ...................... 709/224 |
| 2008/0295095 A1 | 11/2008 | Watanabe et al. | |
| 2010/0005465 A1 | 1/2010 | Kawato | |
| 2010/0030877 A1 | 2/2010 | Yanagisawa | |

FOREIGN PATENT DOCUMENTS

| | | | |
|---|---|---|---|
| JP | 10-283210 | A | 10/1998 |
| JP | 2005-227932 | A | 8/2005 |
| JP | 2007-323245 | A | 12/2007 |
| JP | 2008-293117 | A | 12/2008 |
| JP | 4240062 | B2 | 3/2009 |
| WO | 2008/062864 | A1 | 5/2008 |
| WO | 2008/102739 | A1 | 8/2008 |

* cited by examiner

*Primary Examiner* — Mohamed Ibrahim
(74) *Attorney, Agent, or Firm* — Sughrue Mion, PLLC

(57) ABSTRACT

A workload that can be processed with a resource amount available in a physical server is estimated. An information processing apparatus 20 includes a performance information storage unit 25 that stores information indicating each of plural types of workloads and a resource amount of the physical server allocated to each of the workloads when the workloads are run in a physical server 30, in a manner to be associated with each other, an acquiring unit 21 that acquires a resource amount available in the physical server 30, a comparison unit 22 that selects at least one stored work load, and compares the available resource amount with the resource amount associated with the selected workload, and a first extraction unit 23 that extracts the selected workload if the compared resource amount is less than or equal to the available resource amount.

10 Claims, 9 Drawing Sheets

FIG. 2

| No. | WORKLOAD TYPE | CPU | MEMORY | HDD | COMMUNICATION |
|---|---|---|---|---|---|
| 1 | WORKLOAD A | 6 | 256 | 10 | 0 |
| 2 | WORKLOAD A | 12 | 256 | 10 | 0 |
| 3 | WORKLOAD A | 18 | 256 | 20 | 0 |
| ... | ... | ... | ... | ... | ... |
| 31 | WORKLOAD D | 10 | 512 | 20 | 20 |
| 32 | WORKLOAD D | 12 | 512 | 20 | 40 |
| 33 | WORKLOAD D | 14 | 512 | 20 | 60 |
| ... | ... | ... | ... | ... | ... |

INFORMATION PROCESSING APPARATUS AND INFORMATION PROCESSING METHOD

CROSS REFERENCE TO RELATED APPLICATIONS

This application is a National Stage of International Application No. PCT/JP2011/000097 filed Jan. 12, 2011, claiming priority based on Japanese Patent Application No. 2010-018990, filed Jan. 29, 2010, the contents of all of which are incorporated herein by reference in their entirety.

TECHNICAL FIELD

The present invention relates to an information processing apparatus and an information processing method.

BACKGROUND ART

In recent years, with the aim of improving processing efficiency and enhancing availability, information processing systems have been configured in a manner that can delegate processing from one physical server to the other physical server. In such cases, it is effective to estimate, in advance, a load which the delegated processing puts on the physical server serving as the delegating destination. More specifically, in the case where the estimated loads do not exceed the capacity of the physical server serving as the delegating destination, the processing is delegated to this physical server, so that the processing efficiency and the availability of the entire system can be improved.

As this type of technique, Patent Document 1 (Japanese Patent No. 4240062) describes an virtual server environment including plural physical servers operating virtual servers, in which available processing capacities of each of the physical servers are measured under the same standard.

Further, as this type of technique, Patent Document 2 (Japanese Patent Application Laid-open No. 2005-227932) describes that the processing amount of integer calculation and the processing amount of floating-point calculation made by an evaluation target software are estimated for plural calculators, thereby estimating the processing time of the evaluation target software.

RELATED ART DOCUMENT

Patent Document

Patent Document 1: Japanese Patent 4240062
Patent Document 2: Japanese Patent Application Laid-open No. 2005-227932

SUMMARY OF THE INVENTION

Technical Problem

However, the above-described techniques need to be improved in the following points. In Patent Document 2, the amount of processing of the integer calculation or floating-point calculation is estimated on the basis of a dedicated index value, and the estimated amount does not directly indicate the loads applied to a resource. Thus, the estimation method described in Patent Document 2 is not appropriate for estimating the workload that can be processed with the resource amount available in the physical server.

The present invention has been made in view of the circumstances described above, and an object of the present invention is to provide an information processing apparatus and an information processing method capable of estimating a workload that can be processed with the amount of resource available in the physical server.

Solution to Problem

An information processing apparatus according to one aspect of the present invention includes: a performance information storage unit that, when plural types of workloads are run in a physical server, stores information indicating each of the workloads and a resource amount of the physical server allocated to each of the workloads, in a manner that the information and the resource amount are associated with each other; an acquiring unit that acquires an available resource amount in the physical server; a comparison unit that selects at least one workload from information stored in the performance information storage unit, and compares the resource amount associated with the selected workload with the available resource amount acquired by the acquiring unit; and a first extraction unit that extracts the workload selected by the comparison unit if the resource amount compared by the comparison unit is less than or equal to the available resource amount.

Further, an information processing method according to another aspect of the present invention includes computer implemented processes of: when plural types of workloads are run in a physical server, storing information indicating each of the workloads and a resource amount of the physical server allocated to each of the workloads, in a manner that the information and the resource amount are associated with each other; acquiring an available resource amount in the physical server; selecting at least one workload from the stored workloads; comparing a resource amount associated with the selected workload with the acquired available resource amount; and extracting the selected workload if the compared resource amount is less than or equal to the available resource amount.

Yet further, a program according to another aspect of the present invention causes a computer to execute processes including: a first storage process of, when plural types of workloads are run in a physical server, storing information indicating each of the workloads and a resource amount of the physical server allocated to each of the workloads, in a manner that the information and the resource amount are associated with each other; an acquiring process of acquiring an available resource amount in the physical server; a comparison process of selecting at least one workload from the workloads stored in the first storage process, and comparing a resource amount associated with the selected workload with the available resource amount acquired in the acquiring process; and a first extraction process of extracting the workload selected in the comparison process if the resource amount compared in the comparison process is less than or equal to the available resource amount.

Effect of the Invention

The present invention provides an information processing apparatus and an information processing method, which estimates a workload that can be processed with a resource amount available in a physical server.

BRIEF DESCRIPTION OF THE DRAWINGS

The above-described object and other objects, and features and advantages will be made further clear by the preferred exemplary embodiment described below and the following attached drawings.

FIG. 2 is a diagram illustrating a table stored in a performance information storage unit according to the first exemplary embodiment.

DESCRIPTION OF EMBODIMENTS

Figure 1:
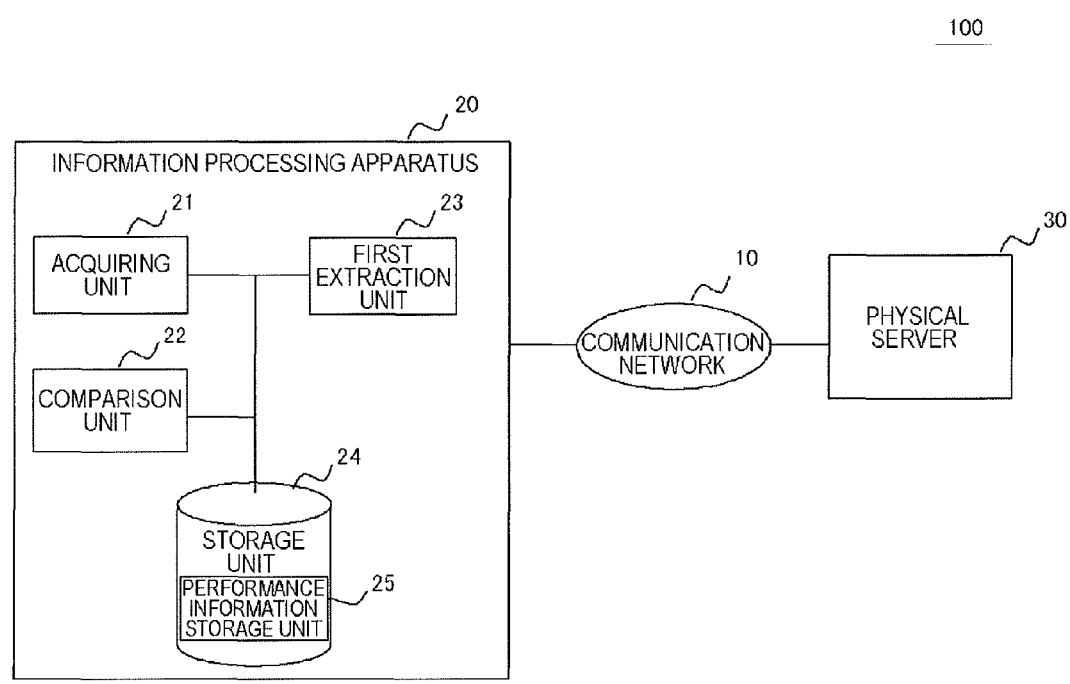
FIG. 1 is a configuration diagram of an information processing system according to a first exemplary embodiment.

Hereinbelow, exemplary embodiments of the present invention will be described with reference to the drawings. Note that, in all the drawings, the same constituent components are denoted with the same reference characters, and detailed explanation thereof will not be repeated.

First Exemplary Embodiment

First, an information processing system 100 according to a first exemplary embodiment will be described. FIG. 1 is a configuration diagram of the information processing system 100 according to the first exemplary embodiment. The information processing system 100 includes an information processing apparatus 20 capable of receiving and transmitting various kinds of information, programs and virtual servers through a communication network 10, and a physical server 30.

The information processing apparatus 20 includes an acquiring unit 21, a comparison unit 22, a first extraction unit 23, and a storage unit 24. Note that the information processing apparatus 20 may include constituent components other than those illustrated in the drawing.

The storage unit 24 includes a performance information storage unit 25 that, when plural types of workloads are performed in the physical server 30, stores information indicating the amount of resource of the physical server 30 allocated to each of the workloads and information indicating each of the workload in a manner that these pieces of information are associated with each other. It should be noted that the performance information storage unit 25 occupies a part or whole of the storage area of the storage unit 24. Further, the information stored in the performance information storage unit 25 may be acquired from the physical server 30, or from other unit or device not illustrated in the drawing, or from other constituent components contained in the information processing apparatus 20 and not illustrated in the drawing.

The acquiring unit 21 acquires the amount of resource available in the physical server 30. The comparison unit 22 selects at least one workload from the information stored in the performance information storage unit 25, and compares the amount of resource associated with the selected workload with the amount of available resource acquired by the acquiring unit 21. If the amount of resource compared by the comparison unit 22 is less than or equal to the amount of resource available, the first extraction unit 23 extracts the workload selected by the comparison unit 22. In this specification, the workload extracted by the first extraction unit 23 corresponds to a workload which can be processed with the amount of resource available in the physical server 30.

The workload represents a process or a group of processes to which a resource or resources are allocated and that are performed by the resource or resources. More specifically, the workload represents floating-point number calculation, a receiving-transmitting process of user datagram protocol (UDP), a random access to a hard-disk drive, or other processes. Note that the resource allocated to the workload may be either a physical resource or a virtual resource.

In this exemplary embodiment, the amount of resource or amount of resource available is a value indicating any one of a CPU usage ratio (%), the amount of memory used (MB), the bandwidth (MB/s) for reading from and the bandwidth (MB/s) for writing to the hard-disk drive, and the network transmission bandwidth/reception bandwidth (bps), or a combination of any of them. The amount of resource as used in this exemplary embodiment may be a part of the items listed above, or may be the amount of resource of the other types.

The acquiring unit 21 may acquire the amount of resource available in the physical server 30 in an autonomous manner or in a heteronomous manner. For example, the acquiring unit 21 may acquire the amount of resource available at a predetermined point in time, or may acquire the amount of resource available in accordance with a command generated by an operator of the information processing apparatus 20.

FIG. 2 is a diagram illustrating a table stored in the performance information storage unit 25. Note that the format illustrated in this drawing is merely an example, and the drawing does not limit the format. The performance information storage unit 25 may obtain information equivalent to the table in FIG. 2 by associating plural tables.

The performance information storage unit 25 stores information indicating plural workloads and the amounts of plural resources having different values from each other for each of types of workloads in a manner that the information and the amounts of resources are associated with each other. Further, the performance information storage unit 25 stores the resource amounts of different types of resources in a manner to be associated with each of the workloads. More specifically, concerning the same workload type, the performance information storage unit 25 stores information indicating that plural workloads are each associated with a different resource amount of at least one resource from among plural types of resources.

The comparison unit 22 selects at least two workloads from the information stored in the performance information storage unit 25, and compares the available resource amount acquired by the acquiring unit 21 with the sum total of the resource amounts associated with the selected workloads. More specifically, the comparison unit 22 selects the resource amounts associated with the selected at least two workloads, sums the selected resource amounts for each resource type, and compares, for each resource type, the sum total of the resource amounts calculated for each resource type with the available resource amount acquired by the acquiring unit 21.

If the sum total of the resource amounts compared by the comparison unit 22 is less than or equal to the available resource amount, the first extraction unit 23 extracts the plural workloads selected by the comparison unit 22. More specifically, if the sum total of the resource amounts compared by the comparison unit 22 is less than or equal to the available resource amount for all the resource types, the first extraction unit 23 extracts the workloads and the resource amounts selected by the comparison unit 22.

All or part of the acquiring unit 21, the comparison unit 22, and the first extraction unit 23 described above may be realized by hardware, or by a program (or program code) that causes a processor to perform processing. The processor reads out the program from a storage medium such as a nonvolatile memory, and activates the program. In this exemplary embodiment, the storage unit 24 may function as the storage medium to store the program.

In the case where the acquiring unit 21, the comparison unit 22, and the first extraction unit 23 are run by a program, this program is stored in a storage medium that a processor (computer) can read out. The program causes the processor to perform the following processes of:

(a) storing information indicating each of workloads and a resource amount of the physical server 30 allocated to each of the workloads when the plural types of workloads are performed in the physical server 30 in a manner that they are associated with each other;

(b) acquiring the resource amount available in the physical server 30;

(c) selecting at least one workload from information stored in a performance information storing process, and compare the resource amount associated with the selected workload with the available resource amount acquired by the acquiring unit 21; and (d) extracting at least one workload selected in the comparison process if the compared resource amount is less than or equal to the available resource amount.

Figure 3:
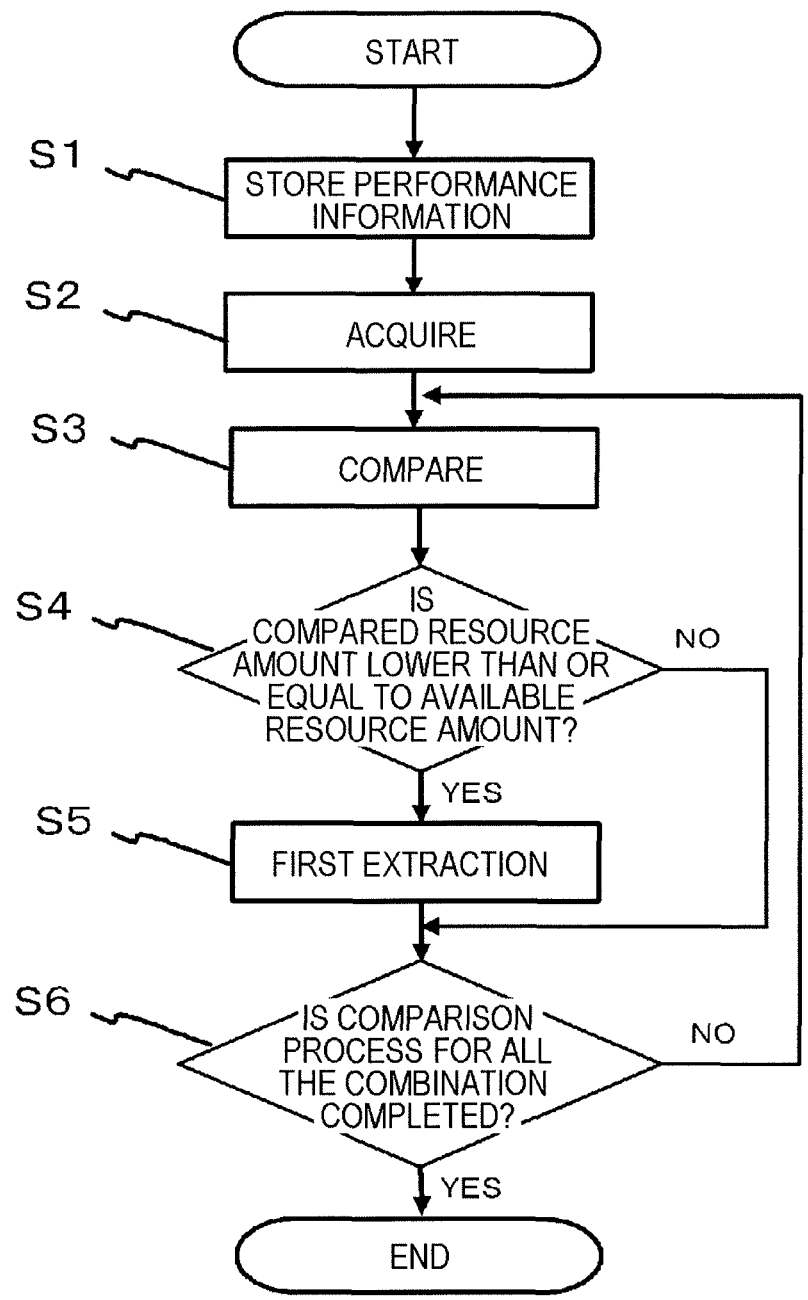
FIG. 3 is a flowchart illustrating an operation flow of an information processing apparatus according to the first exemplary embodiment.

FIG. 3 is a flowchart illustrating an operation flow of the information processing apparatus 20 according to this exemplary embodiment. First, the information processing apparatus 20 stores information indicating each of the workloads and the resource amount allocated to each of the workloads when the plural types of workloads are performed in the physical sever 30 in a manner that they are associated with each other (step S1). Then, the information processing apparatus 20 acquires the amount of resource available in the physical server 30 (step S2). The information processing apparatus 20 selects one workload from among data stored in step S1, and compares the resource amount associated with the selected workload with the available amount acquired by the acquiring unit 21 (step S3). If the resource amount compared in step S3 is less than or equal to the available resource amount (YES in step S4), the workload selected in step S3 is extracted (step S5). If the comparison process in step S3 has been already completed for each of the workloads indicated in the information stored in step S1 and all the combinations of two or more workloads (YES in step S6), this flowcharts ends.

It should be noted that, if the resource amount compared in step S3 exceeds the available resource amount (NO in step S4), this flowchart proceeds to step S6. Further, if the comparison process in step S3 has not been completed for each of the workloads indicated in the information stored in step S1 or for a part of all the combinations of two or more workloads (NO in step S6), the flowchart proceeds to step S3.

Next, effects obtained by this exemplary embodiment will be described. As described above, the workload extracted by the first extraction unit 23 is a workload or combination of workloads that can be processed with the amount of resource available in the physical server 30. In other words, the physical server 30 is not overloaded even if accepting the process of extracted workloads.

Further, in this exemplary embodiment, as the amount of resource allocated to a single workload changes, the change in the amount of other resource is measured, and is stored in the performance information storage unit 25. Thus, the non-linear change in the resource amount (load index) can be taken into consideration at the time of estimation of workloads. This makes it possible to further improve the accuracy of estimation of the workloads.

Second Exemplary Embodiment

Figure 4:
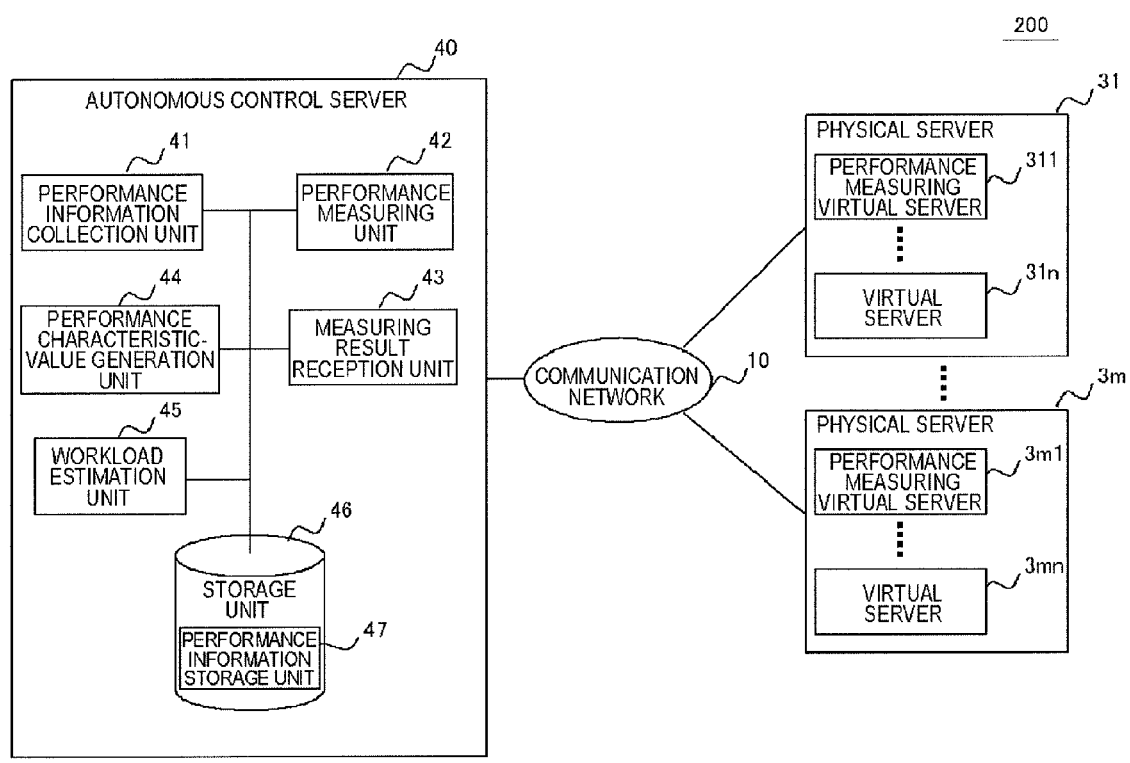
FIG. 4 is a configuration diagram of an information processing system according to a second exemplary embodiment.

Next, an information processing system 200 according to a second exemplary embodiment will be described. FIG. 4 is a configuration diagram of an information processing system 200 according to this exemplary embodiment. As illustrated in FIG. 4, the information processing system 200 includes plural physical servers 31 to 3m (m is a positive number), and an autonomous control server 40 that controls each virtual server running in the physical servers 31 to 3m. The autonomous control server 40 and the physical servers 31 to 3m are connected to each other through a communication network 10. In FIG. 4, in order to identify the virtual servers, virtual servers running in the physical server 31 are denoted by reference characters 311 to 31n, and virtual servers running in the physical server 3m are denoted by reference characters 3m1 to 3mn (n is a positive number).

The physical servers 31 to 3m are realized, for example, by a computer that executes processes in accordance with a program stored in a storage medium such as a magnetic disk, a semiconductor memory and an optical disk.

The autonomous control server 40 includes a performance information collection unit 41, a performance measuring unit 42, a measuring result reception unit 43, a performance characteristic-value generation unit 44 (interpolation unit), a workload estimation unit 45, and a storage unit 46. The storage unit 46 includes a performance information storage unit 47.

From physical servers 31 to 3m and virtual servers or performance measuring virtual servers 311 to 3mn, the performance information collection unit 41 acquires, as a load index, information concerning performances such as CPU usage ratio, the amount of memory used, input-output performance value (for example, ratio of input-output data transfer rate relative to maximum data transfer rate) of a storage medium, performance of communication to communication network 10 (for example, transfer rate or bandwidth used). The performance information storage unit 47 stores, as history data, values of the load indices of physical servers 31 to 3m acquired at predetermined intervals.

The performance measuring unit 42 instructs the performance measuring virtual servers 311 to 3m1 in the physical servers 31 to 3m to measure performance information. Details of the order include types of workloads to be processed, and load values of the workloads to be processed. Hereinafter, the term "workload value" represents information indicating the volume of load of the workload. In the case where the performance measuring virtual server 311 receives the measuring instruction from the performance measuring unit 42, the performance measuring virtual server 311 operates in the following manners. First, the performance measuring virtual server 311 processes a workload with an instructed type in accordance with the instructed load value. The performance measuring virtual server 311 measures the amount of resource in the physical server 31 allocated to this workload. The performance measuring virtual server 311 associates the information indicating the processed workload, the load value of this workload, and the measured resource amount with each other, and notifies the autonomous control server 40 of them as measurement results of the performance information. In this exemplary embodiment, the method of measuring the performance information is realized by, but not particularly limited to, using a known technique such as running a benchmark program or using other dedicated programs. Further, the load value of the workload varies depending on types of the workloads. For example, in the case where the workload is floating-point calculation, the load value corresponds to the number of times of the calculation made. In the case where the workload to be processed is transmission or reception of UDP, the load value of the workload corresponds to the transmission bandwidth and reception bandwidth of a network.

The measuring result reception unit 43 receives the measurement results of the performance information measured in the physical servers 31 to 3m. The performance information storage unit 47 stores the received measurement results of the performance information. For example, the performance information storage unit 47 may store the information indicating the workload of network reception, the load value allocated to the workload at the time when the workload is processed, and the measured reception bandwidth of the network in a manner that they are associated with each other.

On the basis of the relationship between a load value and a resource amount stored in the performance information storage unit 47 in the associated manner, the performance characteristic-value generation unit 44 calculates a performance characteristic value, which is an interpolated value of resource amount that can be allocated to the workload associated with the load value and the resource amount. More specifically, the performance characteristic-value generation unit 44 generates an approximate function on the basis of the measurement results of the performance information stored in the performance information storage unit 47, and generates a performance characteristic value that each workload can take. The performance information storage unit 47 stores the generated performance characteristic value.

Figure 5:
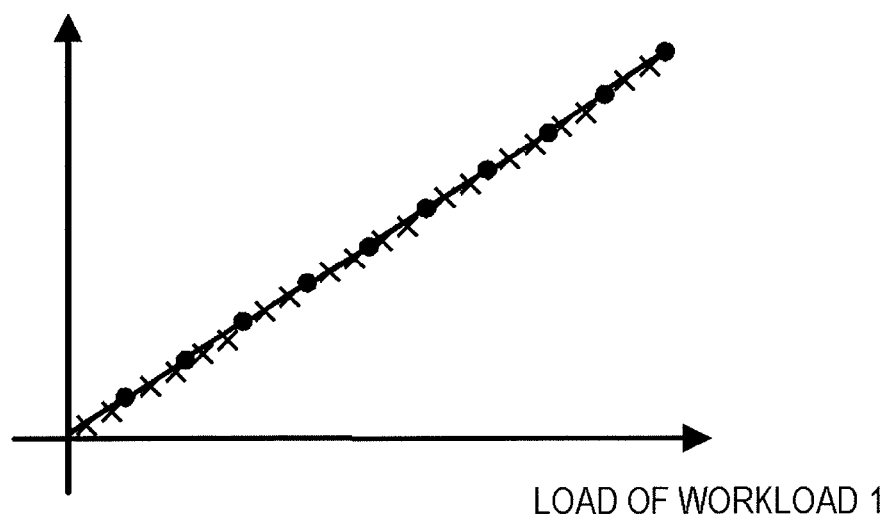
FIG. 5 is a diagram illustrating a relationship between the actually measured resource amount and the calculated performance characteristic value.

FIG. 5 is a diagram illustrating a relationship between the actually measured resource amount and the calculated performance characteristic value. The dot "•" represents the actually measured resource amount, and the dot "x" represents the performance characteristic value interpolated through the approximate function. In this drawing, the workload (workload 1) causing a network load and the reception bandwidth of the network are illustrated in a manner that they have a proportional relationship. However, the relationship is not limited to this. Further, the performance characteristic value stored in the performance information storage unit 47 is obtained by adding the actually measured value to the interpolated value. In this exemplary embodiment, the approximate function employs a coefficient determined through a method of least squares on the basis of a linear function or other functions. However, the coefficient may be calculated through the other method.

The workload estimation unit 45 uses the resource amount and the performance characteristic value of the physical servers 31 to 3m stored in the performance information storage unit 47 to estimate the workload that can be processed using the resource portion available in each of the physical servers 31 to 3m, and store the estimated workload in the performance information storage unit 47.

More specifically, the workload estimation unit 45 acquires, from the performance information storage unit 47, the resource amounts of the virtual servers used by the virtual servers 311 to 3m1 and the acceptable resource amounts that the physical servers 31 to 3m can accept, and on the basis of the difference between these pieces of information, calculates a load index corresponding to the resource amount available in each of the physical servers 31 to 3m. In other words, the workload estimation unit 45 functions equivalently to the acquiring unit 21 in the first exemplary embodiment.

Further, the workload estimation unit 45: selects at least two workloads stored in the performance information storage unit 47; selects, for each workload, the resource amounts or the performance characteristic values associated with each of the selected workloads; calculates the sum of the selected resource amounts or performance characteristic values for each of the resource types; and compares, for each of the resource types, the sum of the calculated resource amounts or performance characteristic values for each of the resource types with the available resource amount acquired by the acquiring unit 21. In other words, the workload estimation unit 45 functions equivalent to the comparison unit 22 in the first exemplary embodiment.

Yet further, if the sum total of the compared resource amounts is less than or equal to the available resource amount for all the resource types, the workload estimation unit 45 combines and extracts the selected workloads and the resource amounts or performance characteristic values. In other words, the workload estimation unit 45 functions equivalently to the first extraction unit 23 in the first exemplary embodiment.

Yet further, for each extracted combination of the workload and the resource amount or performance characteristic value, the workload estimation unit 45 compares the available resource amount with the resource amount or performance characteristic value contained in the combination to calculate evaluation indices, and extracts a combination having the minimum evaluation index.

The performance information storage unit 47 stores the load index collected by the performance information collection unit 41, the measurement results of the performance information received by the measuring result reception unit 43, and the performance characteristic value generated by the performance characteristic-value generation unit 44. In other words, the performance information storage unit 47 at least holds information equivalently to the information contained in the performance information storage unit 25 in the first exemplary embodiment.

Figure 6:
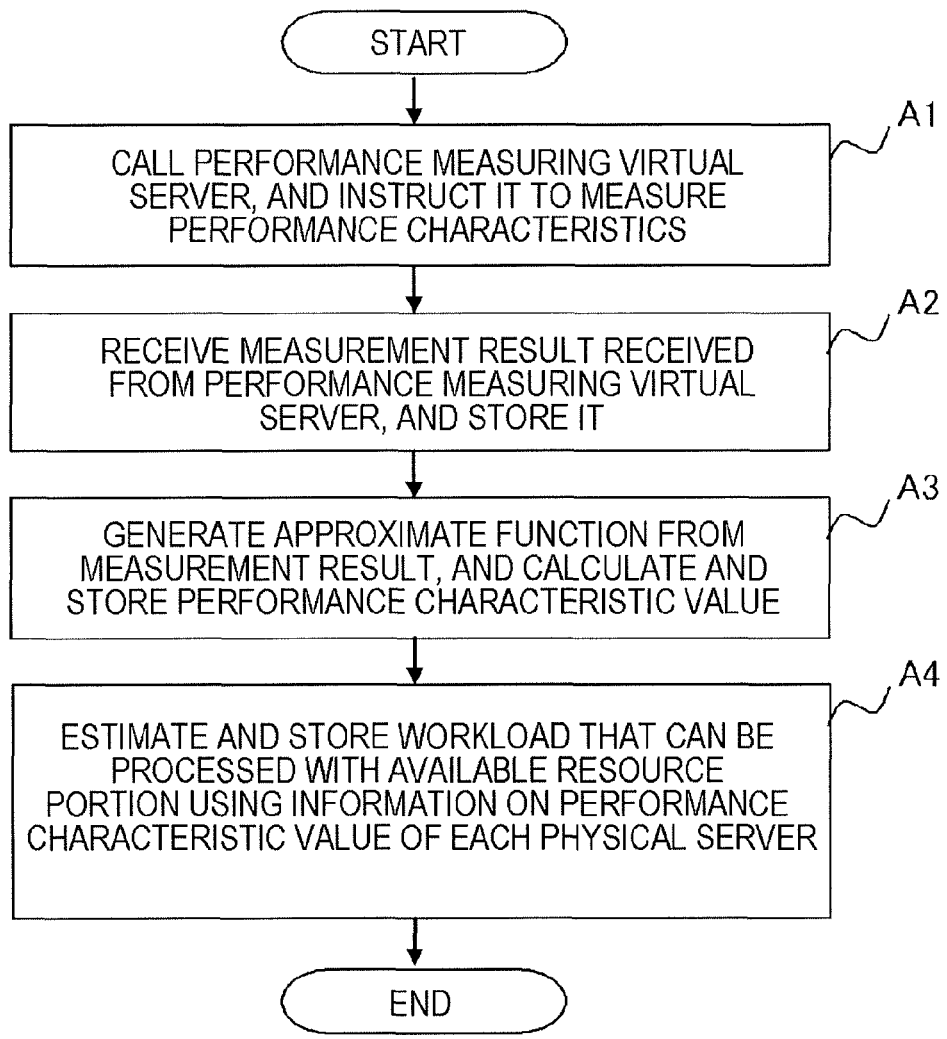
FIG. 6 is a flowchart illustrating an operation flow of an autonomous control server of the second exemplary embodiment.

FIG. 6 is a flowchart illustrating an operation flow of the autonomous control server 40 according to this exemplary embodiment. However, although not illustrated in FIG. 4, the autonomous control server 40 acquires values of the load index of the physical servers 31 to 3m at predetermined intervals as described above, and stores them in the performance information storage unit 47 as a history data.

First, the autonomous control server 40 calls the performance measuring virtual servers 311 to 3m1 in the physical servers 31 to 3m, and instructs them to measure the performance characteristics (step A1). The autonomous control server 40 receives the measurement results sent from the performance measuring virtual servers 311 to 3m1 of the physical servers 31 to 3m, and stores the received measurement results to the performance information storage unit 47 (step A2). The autonomous control server 40 generates an approximate function on the basis of the measurement results of the performance characteristic, interpolates the value between the actual measured values to calculate the performance characteristic value, and stores the calculated performance characteristic value in the performance information storage unit 47 (step A3). Further, the autonomous control server 40 uses the performance characteristic value of the physical servers 31 to 3m stored in the performance information storage unit 47 to estimate a workload that can be processed with the resource portion available in each of the physical servers, and stores information indicating the estimated workload in the performance information storage unit 47 (step A4).

The autonomous control server 40 (workload estimation unit 45) calculates, for each of the resource types, a difference between the available resource amount and the resource amount or performance characteristic value contained in the extracted combination, and sums values obtained by normalizing the calculated difference to obtain the evaluation indices. In other words, the following formulations (1) and (2) can be obtained.

[Formulation 1]

$$\vec{f}_1(\hat{x}_1) + \ldots + \vec{f}_n(\hat{x}_n) = \vec{F} \quad \text{Formulation (1)}$$

$$\Leftrightarrow \begin{pmatrix} f_{11}(\hat{x}_1) \\ \vdots \\ f_{1m}(\hat{x}_1) \end{pmatrix} + \ldots + \begin{pmatrix} f_{n1}(\hat{x}_n) \\ \vdots \\ f_{nm}(\hat{x}_n) \end{pmatrix} = \begin{pmatrix} F_1 \\ \vdots \\ F_m \end{pmatrix}$$

[Formulation 2]

$$G = \|\vec{f}_1(\hat{x}_1) + \ldots + \vec{f}_n(\hat{x}_n) - \vec{F}\| \quad \text{Formulation (2)}$$

Figure 7:
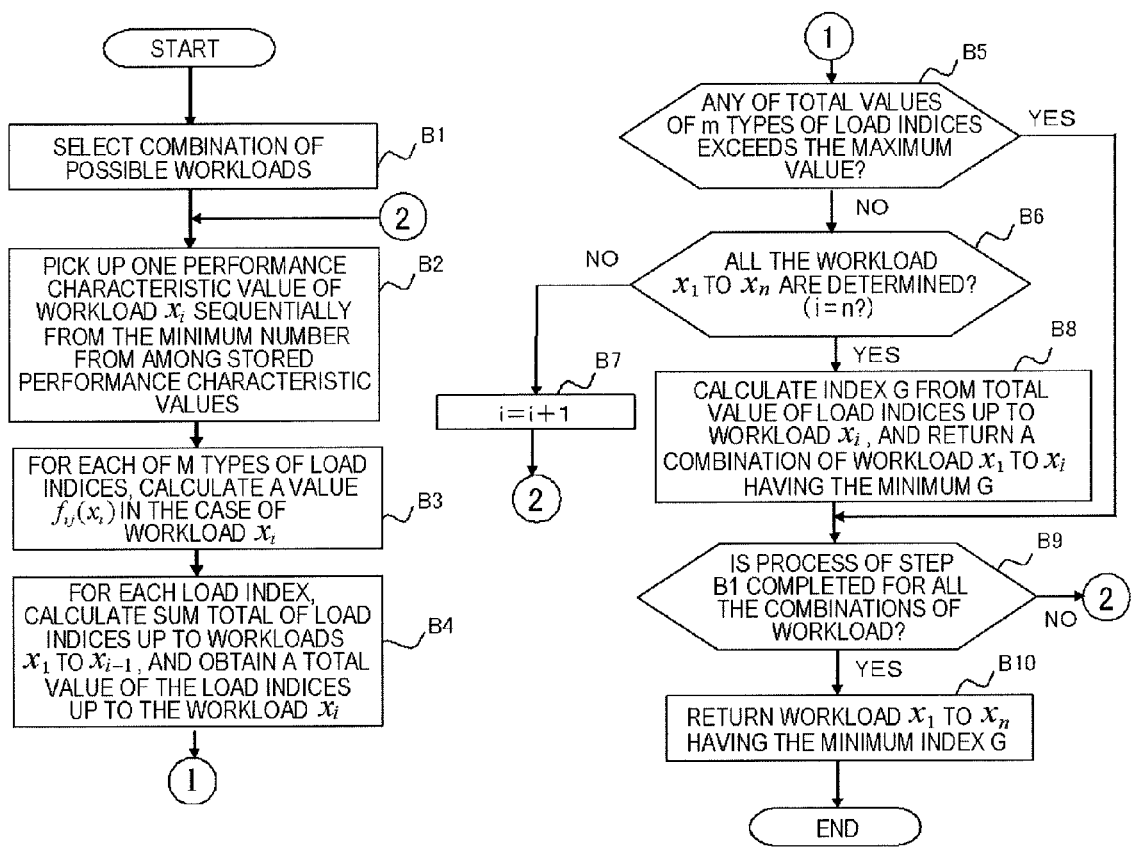
FIG. 7 is a flowchart illustrating a procedure of obtaining a combination of values of workloads that make an evaluation index minimum.

Each of the characters in Formulation (1) and Formulation (2) represents as follow:

n: number of types of workloads
m: value of a load index associated with a single workload
$x_i$: variable representing a certain type of a workload i
$f_{ij}(x)$: value of a load index j when a performance characteristic value of a workload i is x
G: evaluation index FIG. 7 is a flowchart illustrating a procedure of obtaining a combination of workloads that minimizes the above-described evaluation index G. First, combinations of workloads that can be taken are selected (step B1). If n types of combinations of workloads are selected in step B1, a performance characteristic value of a workload $x_i$ for the first workload type (i=1) is picked up sequentially from the minimum number from among performance characteristic values stored in the performance information storage unit 47 (step B2). Then, for each of m types of load indices, a performance characteristic value $f_{ij}(x_i)$ in the case of the workload $x_i$ is calculated (step B3). The calculated values of the load indices are summed for each of the load indices to obtain a total value of the load indices up to workloads $x_1$ to $x_{i-1}$, thereby obtaining the total value of the load indices up to the workload $x_i$ (step B4).

If, of the total values of the m types of load indices calculated in step B4, no total value exceeds the maximum value (NO in step B5) and all the workloads $x_1$ to $x_n$ are not determined (NO in step B6), one is added to i (step B7), and a process of step B2 is performed for the next workload $x_{i+1}$.

If all the workloads $x_1$ to $x_n$ are already determined (i=n, Yes in step B6), the evaluation index G is calculated on the basis of the total values of load indices up to the work load $x_i$, and the set of workloads $x_1$ to $x_n$ having the minimum evaluation index G is returned (step B8). Then, if the process of step B1 is not completed for a part of combinations of the workloads (NO in step B9), the flow proceeds to step B2, and calls the next set of workloads.

Further, if, of all the total values of m types of load indices calculated in step B3, at least one total value exceeds the maximum value (YES in step B5) and the process of step B1 is not completed for a part of combinations of the workloads (NO in step B9), the flow proceeds to step B2, and calls the next set of workloads.

If the process of step B1 is completed for all the combinations of workloads (YES in step B9), the combinations of workloads having the minimum evaluation index G are extracted as the estimation values from among the returned combinations of workloads (step B10).

Next, effects obtained by this exemplary embodiment will be described. The performance characteristic value is generated on the basis of the relationship between the actually measured workload and the load index, and the workload is estimated on the basis of the generated performance characteristic value, so that it is possible to highly precisely estimate the workloads of the virtual servers running in the physical servers having different performances. This makes it possible to eliminate the occurrence of insufficient capacity or excessive available resource of virtual server.

An operator of the autonomous control server 40 can view the combination of the workload and the resource amount or performance characteristic value extracted by the workload estimation unit 45. This enables the operator to compare the processing performances of virtual servers on the basis of the estimated value of the workload occurring in the case where each of the virtual servers is run using the resource available in each of the physical servers 31 to 3m.

Third Exemplary Embodiment

Figure 8:
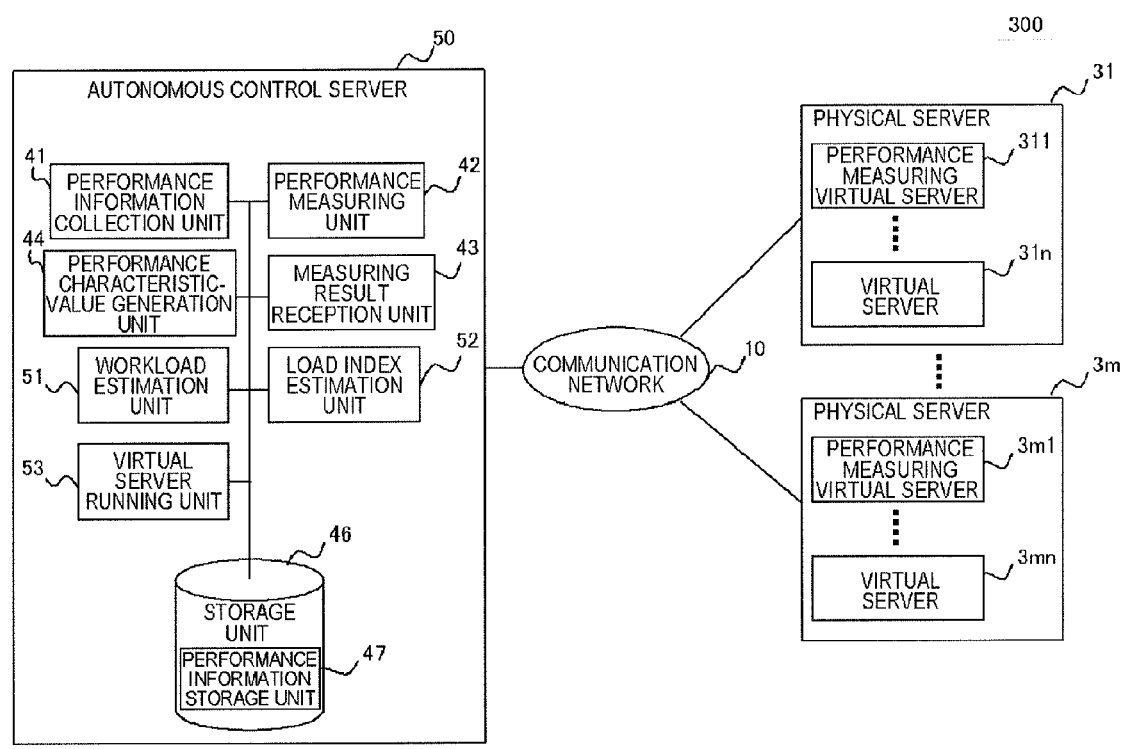
FIG. 8 is a configuration diagram of an information processing system according to a third exemplary embodiment.

Next, a third exemplary embodiment will be described in detail with reference to the drawings. FIG. 8 is a configuration diagram of an information processing system 300 according to this exemplary embodiment. The information processing system 300 includes an autonomous control server 50, which is different from the autonomous control server 40 in the second exemplary embodiment in that the autonomous control server 50 includes a workload estimation unit 51, a load index estimation unit 52, and a virtual server running unit 53. The other constituent components are equal to those described in the second exemplary embodiment, and detailed description thereof will be not repeated.

The workload estimation unit 51 can perform a process equivalent to the workload estimation unit 45 in the second exemplary embodiment. Further, the workload estimation unit 51 acquires a load index (resource amount) of a virtual server used by a virtual server 3ip (2≤p≤n) running, for example, in a physical server 3i (1≤i≤m) of plural physical servers 31 to 3m, and obtain the amount of resource available in another physical server 3j (1≤m≤m, i≠j). Yet further, the workload estimation unit 51 selects at least one workload stored in the performance information storage unit 47, and compares the resource amount associated with the selected workload with the acquired load index of the virtual server. Then, the workload estimation unit 51 extracts the selected workload if the compared load index is close to the load index of the virtual server. In this exemplary embodiment, it is assumed that the workload extracted by the workload estimation unit 51 is a workload corresponding to the virtual server 3ip.

The load index estimation unit 52 extracts a load index associated with the workload, this workload being stored in the performance information storage unit 47, being associated with the physical server 3j and being extracted by the workload estimation unit 51, and then, stores the extracted load index in the performance information storage unit 47. In this exemplary embodiment, the load index extracted by the load index estimation unit 52 is an estimated value of the load index at the time when the virtual server 3$iq$ is run in the physical server 3$j$.

The virtual server running unit 53 runs the virtual server 3$iq$ in the physical server 3$j$ if the amount of resource available in the physical server 3$j$ acquired by the workload estimation unit 51 is larger than the load index extracted by the load index estimation unit 52.

Figure 9:
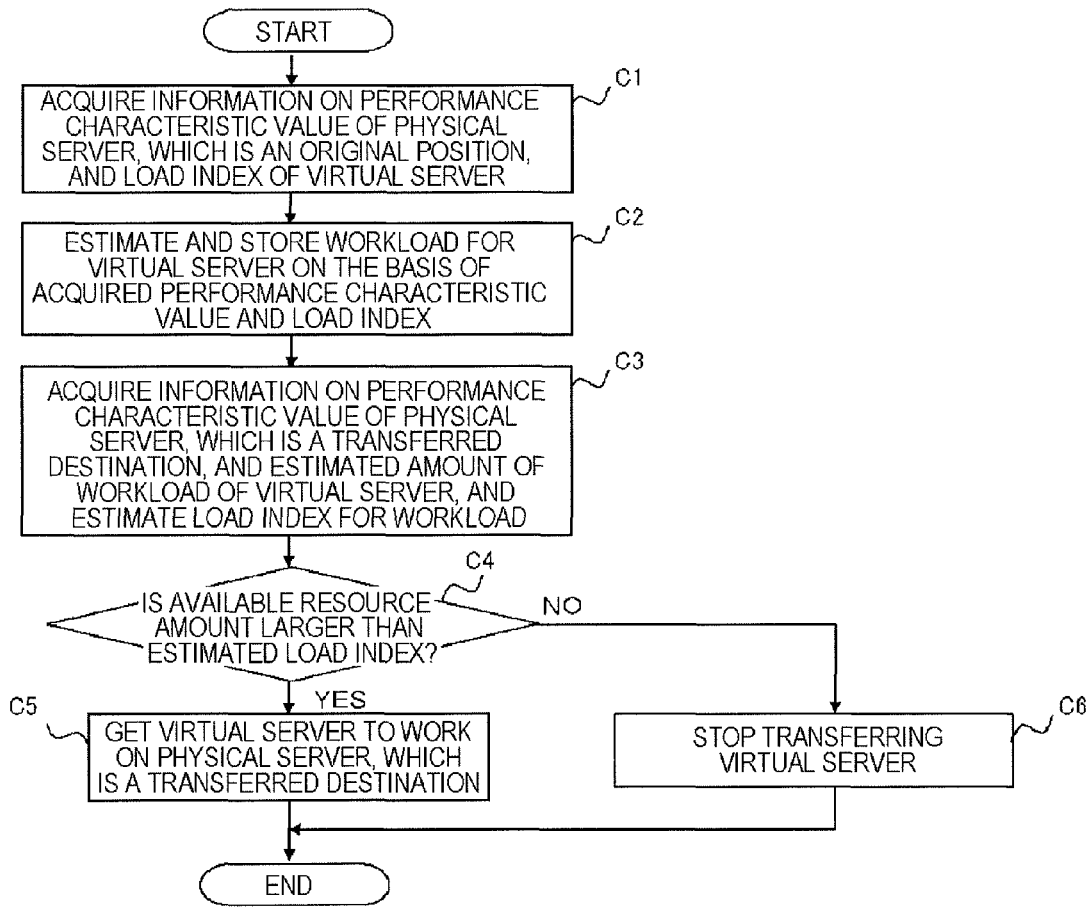
FIG. 9 is a flowchart illustrating an operation flow of an autonomous control server of the third exemplary embodiment.

FIG. 9 is a flowchart illustrating an operation flow of an autonomous control server 50. Note that it is assumed that the autonomous control server 50 has already collected the measurement results of the performance characteristics of the physical servers 31 to 3$m$ that have been already installed, and has already stored the measurement results in the performance information storage unit 47.

First, the autonomous control server 50 acquires the performance characteristic value of the physical server 3$i$, which is an original position, and the load index of the virtual server 3$ip$ from the performance information storage unit 47 (step C1). Then, the autonomous control server 50 estimates a workload of the virtual server 3$ip$ on the basis of the performance characteristic value and the load index acquired in step C1 as described above, and stores information indicating the estimated workload in the performance information storage unit 47 (step C2). Further, the autonomous control server 50 acquires a performance characteristic value of the physical server 3$j$, which is a transferred destination, and the estimated amount of the workload of the virtual server 3$ip$ from the performance information storage unit 47, estimates a load index of this workload, and stores the estimated load index in the performance information storage unit 47 (step C3). If the acquired amount of resource available in the physical server 3$j$ is larger than the estimated load index (YES in step C4), the autonomous control server 50 causes the virtual server 3$iq$ to run in the physical server 3$j$ (step C5). If the acquired amount of resource available in the physical server 3$j$ is smaller than the estimated load index (NO in step C4), the autonomous control server 50 stops the transfer of the virtual server 3$iq$ to the physical server 3$j$ (step C6).

Effects obtained by this exemplary embodiment will be described. According to this exemplary embodiment, the performance characteristic value is generated on the basis of the relationship between the actually measured workload and the load index, and then, the workload and the load index are estimated, whereby it is possible to highly precisely estimate the load index on the physical server, which is a transferred destination of the virtual server and has a characteristic different from the original server. This makes it possible to eliminate the occurrence of insufficient capacity or excessive available resource of virtual server.

An operator of the autonomous control server 50 can view the estimated value of the load index stored in the performance information storage unit 47 as the amount of increase in the load index occurring on the physical server 3$j$, which is the transferred destination.

Each of the exemplary embodiments has been described with reference to the drawings. However, these exemplary embodiments are merely examples, and various configurations other that those described above may be employed.

In the descriptions in the exemplary embodiments above, plural flowcharts are used, and in each of the flowcharts, plural steps are specified in a sequential order. However, this specification of the order does not limit the order of the respective steps in the information processing method according to the present invention. Therefore, at the time of performing the information processing method according to the present invention, the order of the plural steps may be changed, provided that such a change does not impair the contents thereof.

It should be noted that, naturally, the above-described exemplary embodiments and plural modification examples can be combined, provided that contents thereof do not contradict each other. Further, in the above-described exemplary embodiments and modification examples thereof, functions of the constituting elements have been specifically described. However, these functions may be changed in various manners within the scope that satisfies the present invention.

[Supplementary Note 1]

An information processing system comprising:

plural physical servers capable of transferring and receiving a virtual server through a communication network;

a performance information storage unit that stores information indicating each of plural types of workloads and a resource amount of each of physical servers allocated to each of the workloads when the plural types of workloads are run in the physical servers, in a manner to be associated with each other, with respect to each of the physical servers;

a first acquiring unit that acquires a virtual server resource amount used by a virtual server running in a first physical server of the physical servers;

a comparison unit that selects at least one workload from the information stored in the performance information storage unit, and compares the resource amount associated with the selected workload with the virtual server resource amount acquired by the first acquiring unit;

a first extraction unit that, when the resource amount compared by the comparison unit is less than or equal to the virtual server resource amount, extracts the workload selected by the comparison unit;

a second extraction unit that calculates an evaluation index of the virtual server resource amount and the resource amount associated with the workload extracted by the first extraction unit, and extracts a workload having the minimum evaluation index; and a third extraction unit that extracts a resource amount associated with the workload which is stored in the performance information storage unit, is associated with a second physical server different from the first physical server, and is extracted by the second extraction unit.

[Supplementary Note 2]

The information processing system according to Supplementary Note 1, in which the performance information storage unit stores a resource amount of a first resource and a resource amount of a second resource, which are allocated to each of the plural types of the workloads when the workloads are run, in a manner to be associated with each other, with respect to each workload;

the system further includes an estimation unit that calculates, for each of the workloads, interpolated values of the first resource and the second resource that can be allocated to the workload on the basis of a relationship between the resource amount of the first resource and the resource amount of the second resource stored in the performance information storage unit;

the performance information storage unit stores the interpolated values calculated by the estimation unit in a manner to be associated with each of the plurality of types of workloads;

the comparison unit selects, for each of the workloads, the resource amounts or the interpolated values associated with the selected workload, calculates a sum total of the selected resource amounts or the selected interpolated values for each type of resource, and compares, for each type of resource, the calculated sum total of the resource amounts or the interpolated values with the virtual server resource amount acquired by the first acquiring unit;

the first extraction unit combines the workload selected by the comparison unit with the resource amount or the interpolated value and extracts the combination if the sum total of the resource amounts compared by the comparison unit is less than or equal to the virtual server resource amount in all the types of resource; and the second extraction unit compares the virtual server resource amount with the resource amount or the interpolated value contained in the combination extracted by the first extraction unit to calculate an evaluation index, and extracts a combination having the minimum evaluation index.

[Supplementary Note 3]

The information processing system according to Supplementary Note 1 or 2, further comprising:

a second acquiring unit that acquires a resource amount available in the second physical server; and a virtual server running unit that runs the virtual server in the second physical server if the available resource amount acquired by the second acquiring unit exceeds the resource amount extracted by the third extraction unit.

[Supplementary Note 4]

An information processing system according to any one of Supplementary Note 1 to Supplementary Note 3, in which the performance information storage unit stores information indicating plural workloads and plural different resource amounts corresponding to the same type of resources in a manner that they are associated with each other with respect to each of the plural types of workloads;

the comparison unit selects, for each workload, the resource amounts associated with the selected workload, and compares the sum total of the selected resource amounts with an available resource amount; and the first extraction unit extracts the workload and the resource amounts selected by the comparison unit if the sum total of the resource amounts compared by the comparison unit is less than or equal to the available resource amount.

[Supplementary Note 5]

An information processing system according to any one of Supplementary Note 1 to Supplementary Note 4, in which the performance information storage unit stores information indicating plural workloads and different resource amounts of plural types of resources in a manner that they are associated with each other with respect to each of the plural types of workloads;

the acquiring unit acquires an available resource amount corresponding to at least one type of resource from among plural types of resources corresponding to the resource amounts stored in the performance information storage unit;

the comparison unit calculates, for each type of resource, a sum total of the resource amounts associated with the selected workload, and compares, for each type of resource, the calculated sum total of the resource amounts with the available resource amount acquired by the acquiring unit; and the first extraction unit extracts the plural workloads selected by the comparison unit if the sum total of the resource amounts compared for each type of resource by the comparison unit is less than or equal to the available resource amount for all the types of resources.

[Supplementary Note 6]

An information processing system according to any one of Supplementary Note 1 to Supplementary Note 5, in which a fourth extraction unit calculates, for each type of resources, a difference between the available resource amount and the resource amount or the interpolated value contained in the combination extracted by the first extraction unit, normalizes the calculated differences, and calculates a sum total of the normalized values to obtains the evaluation index.

The present application claims priority based on Japanese Patent Application No. 2010-018990 filed in Japan on Jan. 29, 2010, the disclosures of which are incorporated herein by reference in their entirety.

The invention claimed is:

1. An information processing apparatus, comprising:
a performance information storage that is configured to store information indicating each of a plurality of types of workloads and resource amounts of resource types of a physical server allocated to each of the workloads when the workloads are run in the physical server, in a manner to be associated with each other;
an acquirer that is configured to acquire available resource amounts of resource types in the physical server;
a comparer that is configured to select workloads from the information stored in the performance information storage, to sum, for each resource type, the resource amounts associated with the selected workloads, and to compare, for the selected workloads, the sum total of the resource amounts calculated for each resource type with the available resource amount for each resource type acquired by the acquirer; and
a first extractor that is configured to extract all the combinations of workloads in which the sum total of the resource amounts for each resource type is less than the available resource amount of each resource type, based on the comparison result of the comparer.

2. The information processing apparatus according to claim 1, wherein
the comparer is configured to select at least two workloads stored in the performance information storage, and to compare the sum total of the resource amounts associated with the selected workloads with the available resource amount acquired by the acquirer; and
the first extractor is configured to extract the workloads selected by the comparer if the sum total of the resource amounts compared by the comparer is less than or equal to the available resource.

3. The information processing apparatus according to claim 2, further comprising
a measurer that is configured to instruct a performance measuring virtual server in the physical server to run a plurality of types of workloads, and to notify the performance measuring virtual server of a load value of each of the workloads to be run, wherein
the performance measuring virtual server measures a resource amount in the physical server allocated to each of the workloads when running the workloads with the notified load values, and notifies information indicating each of the workloads, a load value corresponding to each of the workloads in a manner to be associated with each other; and
the performance information storage is configured to store the information indicating the workloads, the load values, and the resource amounts, each of which is notified in the associated manner by the performance measuring virtual server.

4. The information processing apparatus according to claim 3, further comprising
an interpolator that is configured to calculate, on the basis of a relationship between the load value and the resource amount stored in the associated manner in the performance information storage, an interpolated value of a resource amount that can be allocated to the workload associated with the load value and the resource amount, wherein the performance information storage is configured to store the interpolated value calculated by the interpolator in a manner to be associated with each of the plurality of types of the workloads;

the comparer is configured to select, for each workload, the resource amount or the interpolated value associated with each of the selected workloads, and to calculate, for each type of resources, a sum total of the selected resource amounts or the selected interpolated values, and compares, for each of the types of the resources, the sum total of the resource amounts or the interpolated values calculated for each of the types of the resources with the available resource amount acquired by the acquirer; and the first extractor is configured to extract the workloads and the resource amount or the interpolated value selected by the comparer if the sum total of each of the resource amounts compared by the comparer is less than or equal to the available resource amount for all the resource types.

5. The information processing apparatus according to claim 4, wherein the first extractor is configured to combine the workloads selected by the comparer with the resource amount or the interpolated value, and to extract the thus obtained combination, and said apparatus further comprises a fourth extractor that is configured to compare the resource amount or the interpolated value contained in the combination with the available resource amount for each combination of the workload and the resource amount or the interpolated value extracted by the first extractor to calculate an evaluation index, and to extract a combination having the minimum evaluation index.

6. The information processing apparatus according to claim 1, wherein when a virtual server is run in the physical server, the acquirer acquires a virtual server resource amount used by the virtual server, and a resource acceptable amount that the physical server can accept, and obtains the available resource amounts of resource types on the basis of a difference between the acquired resource acceptable amount and the virtual server resource amount.

7. The information processing apparatus according to claim 6, wherein the comparer further compares the resource amounts of resource types associated with the selected workloads with the virtual server resource amount acquired by the acquirer, and said apparatus further comprises a second extractor that is configured to extract the workloads selected by the comparer if the resource amounts of resource types compared by the comparer is close to the virtual server resource amount.

8. The information processing apparatus according to claim 7, wherein the performance information storage is configured to store the information indicating each of the workloads and the resource amounts of resource types allocated to each of the workloads in a manner to be associated with each other when the plurality of types of workloads are run in a physical server with respect to each of a plurality of physical servers capable of transferring and receiving a virtual server through a communication network;

the acquirer is configured to acquire the virtual server resource amount used by the virtual server running in a first physical server, and further to acquire an available resource amount in a second physical server, the plurality of physical servers including the first physical server and the second physical server;

the comparer is configured to select at least one workload from the information stored in the performance information storage, and to compare a sum total of a resource amount associated with the selected workload with the available resource amount acquired by the acquirer; and the second extractor is configured to extract the workload selected by the comparer if the resource amount compared by the comparer is close to the virtual server resource amount, said apparatus further comprises:

a third extractor that is configured to extract a resource amount associated with the workload which is stored in the performance information storage, is associated with the second physical server, and is extracted by the second extractor; and a virtual server executor that is configured to run the virtual server in the second physical server if the available resource amount in the second physical server acquired by the acquirer is larger than the resource amount extracted by the third extractor.

9. An information processing method including computer implemented processes of:

storing information indicating each of a plurality of types of workloads and resource amounts of resource types of a physical server allocated to each of the workloads when the workloads are run in the physical server, in a manner to be associated with each other;

acquiring available resource amounts of resource types in the physical server;

selecting workloads from the stored workloads;

summing, for each resource type, the resource amounts associated with the selected workloads;

comparing, for the selected workloads, the sum total of the resource amounts calculated for each resource type with the acquired available resource amount for each resource type; and extracting all the combinations of workloads in which the sum total of the resource amounts for each resource type is less than the available resource amount of each resource type, based on the comparison result of the comparison.

10. A non-transitory computer-readable storage medium storing a program for causing a computer to execute:

a first storage process of storing information indicating each of a plurality of types of workloads and resource amounts of resource types of a physical server allocated to each of the workloads when the workloads are run in the physical server, in a manner to be associated with each other;

an acquiring process of acquiring available resource amounts of resource types in the physical server;

a comparison process of selecting workloads from the workloads stored in the first storage process, summing, for each resource type, the resource amounts associated with the selected workloads, and comparing, for the selected workloads, the sum total of the resource amounts calculated for each resource type with the available resource amount acquired in the acquiring process for each resource type; and a first extraction process of extracting all the combinations of workloads in which the sum total of the resource amounts for each resource type is less than the available resource amount of each resource type, based on the comparison result of the comparison process.

* * * * *

UNITED STATES PATENT AND TRADEMARK OFFICE
CERTIFICATE OF CORRECTION

PATENT NO. : 9,218,214 B2
APPLICATION NO. : 13/575890
DATED : December 22, 2015
INVENTOR(S) : Toshinori Takemura Page 1 of 1

It is certified that error appears in the above-identified patent and that said Letters Patent is hereby corrected as shown below:

Specification

Column 10, Line 52: Delete "($1 \leq m \leq m$," and insert --($1 \leq j \leq m$,--

Signed and Sealed this
Nineteenth Day of July, 2016

Michelle K. Lee
*Director of the United States Patent and Trademark Office*